Patented May 1, 1945

2,374,680

UNITED STATES PATENT OFFICE 2,374,680

COMPOUNDS OF THE CYCLOPENTANO-POLYHYDROPHENANTHRENE SERIES AND METHODS OF THEIR PREPARATION

Willard M. Hoehn, Kansas City, Mo., assignor to George A. Breon & Company, Incorporated, Kansas City, Mo., a corporation of Missouri No Drawing. Application August 17, 1942, Serial No. 455,078

4 Claims. (Cl. 260—397.1)

This invention relates to new compounds of the cyclopentanopolyhydrophenanthrene series and methods of their preparation. It more particularly concerns certain new derivatives of cholic acid having the general formula

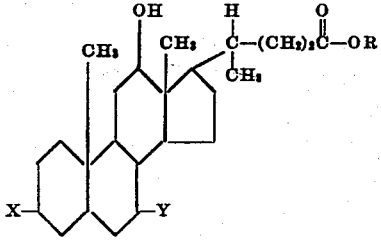

where R represents hydrogen, an alkyl radical or a metal, X represents a hydroxyl group, an aroyloxy group such as the benzoxy group, or an acyloxy group such as the acetoxy group, and Y represents a double bonded oxygen, a semicarbazone radical, or a hydrazone radical.

The cholic acid derivatives having the formula just stated are in general useful either directly as therapeutics or as intermediate products in the preparation of therapeutics. Of particular interest and value in this connection is the compound, 3,12-dihydroxy-7-ketocholanic acid.

It is, therefore, among the objects of the invention to provide a method of preparation of such compounds which is adapted to commercial application and production of the desired compounds in a substantially pure state.

Other objects and advantages will be apparent as the description of the invention proceeds.

The invention, then, consists in the new compounds and methods of preparing the same hereinafter more fully described and particularly pointed out in the claims, the following description, together with the examples, setting forth but a few of several ways of putting the invention into effect.

In accordance with the present invention, ketocarboxylic acids, such as 3,12-dihydroxy-7-ketocholanic acid, having the structural formula

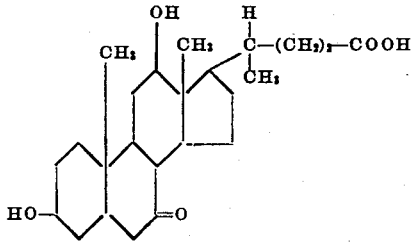

or derivatives thereof, are prepared from cholic acid having the structural formula

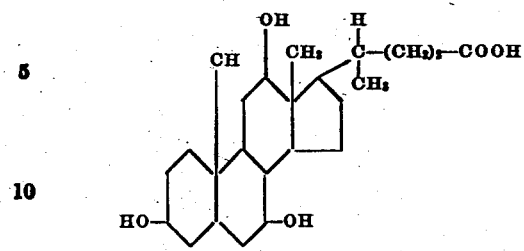

or suitable derivatives thereof by controlled oxidation of the cholic acid compound to form a compound having a keto group attached to the carbon atom at the 7-position in the ring, by removing two hydrogen atoms from the secondary alcohol group at the carbon atom in the 7-position. Thereafter the keto compound may be isolated in substantially pure form, preferably by converting the keto compound to an ester, and thereafter to a semicarbazone or hydrazone, which is then hydrolyzed to the keto ester. Saponification of the ester then yields the desired 7-keto-hydroxycarboxylic acid. In some instances the semicarbazone or hydrazone will be the desired end product, in which case the process will be stopped with the formation and isolation of these compounds. Additionally, as an alternative course, the ester of the 7-keto compound may be hydrolyzed directly in suitable manner to give the desired keto acid.

It is sometimes desirable to protect the hydroxyl group attached to the carbon atom in the 3-position against oxidation, as by converting it to an acyloxy group, such as benzoxy or some other similar group, which can be readily removed later, if desired, with reformation of the hydroxy group at this position. Protecting the hydroxy group as above described tends to produce higher yields of the desired product.

As aforementioned, cholic acid ($C_{23}H_{36}(OH)_3CO_2H$)

or derivatives thereof having a cholic acid nucleus are employed as the starting material and are readily obtained in large quantities. Among the derivatives of cholic acid suitable might be mentioned the esters of cholic acid, such as alkyl cholates, e. g., methyl or ethyl cholate, the 3-acyloxy esters, the aryl and alkyl esters of cholic acid, and the water soluble salts of cholic acid.

The oxidation of the starting material may be brought about by the use of inorganic oxidants in an inert solvent medium, among which are benzene, toluene, methyl acetate, chloroform, and acetic acid, both glacial and dilute.

The inorganic oxidants suitable are chromic acid or oxide in dilute acetic acid, potassium dichromate in dilute mineral acid, e. g., sulphuric acid, and potassium permanganate in either water or acetic acid.

Alternatively and preferably the oxidation of cholic acid or its derivatives is carried out by the use of suitable bacteria, in view of the yield of the desired product having a ketone group at the 7-carbon atom. In this process the derivative is first converted to a water soluble compound and thereafter oxidized in aqueous solution with suitable bacteria. The oxidized product is then treated in the manner outlined above to recover the desired dihydroxyketo-carboxylic acid, semicarbazone, hydrazone or the like.

In carrying out the bacterial oxidation, it has been found that numerous kinds of bacteria may be employed. The following list is illustrative of the types or kinds of bacteria, although it is to be understood that others than the specific ones listed may be employed.

*Alcaligenes faecalis*
*Escherichia coli*
*Staphylococcus aureus*
*Streptococcus pyogenes*
*Eberthella typhosa*

Both aerobic and anaerobic bacteria have been found suitable, as well as bacteria from different families. The concentration of the water soluble cholate in the oxidizing solution containing the bacteria must be controlled rather closely in order that bacterial growth will be maintained and perform the desired function. A concentration of from 0.02 to 4 per cent by weight of the water soluble cholic acid derivative, and preferably a concentration of from 0.5 to 3 per cent by weight, may be suitably employed. It is necessary to have a suitable nutrient medium present for the bacteria and the following is illustrative of a suitable medium, although others may be used.

| | |
|---|---|
| Ammonium sulfate _____ g__ | 188 |
| Sodium chloride_____ g__ | 199 |
| Potassium dihydrogen phosphate 0.2 molar _____ c.c__ | 4000 |
| Sodium hydroxide 1N_____ c.c__ | 799 |
| Salt mixture_____ c.c__ | 40 |
| 0.5% MgCl₂ | |
| 0.5% FeCl₂ | |
| 0.5% CaCl₂ | |
| Peptone _____ g__ | 19 |
| Glycerol _____ c.c__ | 63.9 |
| Distilled water to make_____ l__ | 40 |

To this nutrient medium may be added the water soluble cholic acid derivative in the concentrations mentioned above. The solution is then inoculated with a culture of the desired bacteria. After the oxidation has proceeded to the desired extent at a controlled temperature of from 35° to 40° C. and in the presence of oxygen in case an aerobic bacteria is employed, the organisms are removed by filtration or by a centrifuging operation and the crude oxidized acid is precipitated by the addition of an amount of mineral acid, such as hydrochloric, sulfuric or phosphoric acid, to bring the solution to a pH of 2. In general hydrochloric acid is preferred for this step. If the precipitation operation is carried out at 10–20° C., an amorphous precipitate is obtained. The precipitated acids are filtered off and digested with hot water (65–95° C.) to dissolve out any salts, e. g., sodium chloride, in case hydrochloric acid is employed to precipitate the oxidized acids. A stringy mass is obtained that is rendered brittle by the addition of cold water. The brittle mass is then comminuted and dried at 45–50° C.

The crude acid is then purified through its semicarbazone by first esterifying it with the desired alcohol, e. g., methyl or ethyl alcohol. The esterification is best carried out by placing the crude oxidized cholic acid derivative in the desired alcohol containing an acid having a dissociation constant of about $1 \times 10^{-2}$ or greater. The concentration of the acid aiding in the esterification will vary with the particular acid employed. For sulfuric acid a concentration of from 0.2 to 10 per cent by weight, and preferably of from 1 to 3 per cent by weight, of sulfuric acid in the alcohol is preferred, and in case the other acids are employed, an amount will be used to produce a corresponding acidity. Approximately 1 to 3 cubic centimeters of the alcoholic acid solution is employed for each gram of the dried crude oxidized cholic acid or its derivative. The esterification is preferably allowed to proceed at room temperature, although the solution may be brought up to reflux temperature. The esters may be air dried or dissolved in benzene and the benzene distilled off if their separation is desired, although this is not necessary if the semicarbazone is to be prepared.

The following examples illustrate but a few of several ways in which the principle of the invention may be applied but are not to be construed as limiting the invention:

*Example 1*

200 g. of methyl cholate is dissolved in benzene and monobenzolated with one molar equivalent of benzoyl chloride in the presence of one molar equivalent of dry pyridine, thereby producing methyl 3-benzoxy-7,12-dihydroxycholanate. The benzene solution of methyl 3-benzoxy-7,12-dihydroxycholanate is washed with several volumes of water and then oxidized by treatment with 31 g. of chromic acid in 100 c. c. of 40 per cent acetic acid. The benzene layer is washed with water until free of chromium salts, and thereafter the benzene is removed in vacuo, leaving methyl 3-benzoxy-7-keto-12-hydroxy-cholanate, having a melting point of 145–146° C. The latter material may then be treated in the manner set forth in either (a) or (b) below to produce either 3,12-dihydroxy-7-ketocholanic acid or the semicarbazone of the 7-keto compound.

(a) The methyl 3-benzoxy-7-keto-12-hydroxycholanate produced from 200 g. of the starting material, methyl cholate, is dissolved in methyl alcohol and its semicarbazone prepared by refluxing for 2 to 3 hours with 62 g. of semicarbazide hydrochloride and 37 c. c. of pyridine. The mixture is cooled and any solid that separates is filtered off. The methyl alcohol solution of the semicarbazone is treated as follows for purification and separation of the semicarbazone.

The methyl alcohol solution is diluted with a large volume of water and the solid that separates is filtered off and washed with water. The solid is dried to constant weight at 100° C. It is then stirred with three times its weight of methyl alcohol and filtered. The filtrate is diluted with ten volumes of water and the solid that separates is filtered off and dried. The solid is then mixed with three times its own weight of ether, filtered off by suction, and dried at 110° C. The compound, which is the semicarbazone of methyl 3-benzoxy-7-keto-12-hydroxycholanate, melts at 177–178° C. This substance is disclosed and claimed in the Willard M. Hoehn et al. co-pending application for United States Letters Patent on "Hydroxycholanic acids," Serial No. 360,137, filed October 7, 1940.

The purified semicarbazone may be readily converted to 3,12-dihydroxy-7-ketocholanic acid as follows: 20 g. of the semicarbazone is dissolved in a solution comprising 100 c. c. of 50 per cent methyl alcohol and 50 c. c. of sulfuric acid. This solution is heated on a water bath for one hour and allowed to stand at room temperature for 15 hours. Ten volumes of water are added and the stringy material is held back while the supernatant liquid is removed by decantation. The stringy material is washed with warm water and a quantity of 2N-sodium hydroxide is added. Heat is then applied until a clear solution is obtained. The solution is acidified and the precipitate is filtered off and washed with cold water. The precipitate is crystallized from aqueous acetone, giving 3,12-dihydroxy-7-ketocholanic acid having a melting point of 163 to 164° C.

(b) Alternatively the methyl 3-benzoxy-7-keto-12-hydroxycholanate may be converted to 3,12-dihydroxy-7-ketocholanate in the following manner: For example, 2 g. of methyl 3-benzoxy-7-keto-12-hydroxycholanate are dissolved in 20 c. c. of 2N-sodium hydroxide and refluxed for 4 hours. The solution is cooled and acidified with mineral acid. The crude keto-dihydroxycarboxylic acid is washed with 50 c . c. of hot water, the water decanted and the washing repeated. The crude 3,12-dihydroxy-7-ketocholanic acid is crystallized from aqueous acetone solution and possesses a melting point of 163 to 164° C.

Example 2

43 g. of methyl cholate is dissolved in 500 c.c. of glacial acetic acid and the ester is oxidized with 7.5 g. of chromic oxide dissolved in 100 c. c. of 90 per cent acetic acid solution. The hydroxy-keto-ester is precipitated by pouring the reaction mass into water, filtered and dissolved in methyl alcohol. The keto-compound is then converted to the semicarbazone by refluxing the methyl alcohol solution with 14 g. of semicarbazide hydrochloride and 9.6 c. c. of pyridine. The semicarbazone is precipitated by pouring into water and recovered by filtration.

If desired, the semicarbazone may be used as such or further treated for reconversion to the keto compound. For example, 25 g. of the semicarbazone of methyl 3,12-dihydroxy-7-keto cholanate are dissolved in a solution comprising 100 c. c. of 50 per cent aqueous methyl alcohol and 50 c. c. of sulfuric acid, and heated on a water bath for one-half hour. The crude acid ester is precipitated by dilution with water and washed with dilute bicarbonate solution. The precipitate is dissolved in 2N-sodium hydroxide and heated to boiling. The solution is acidified with mineral acid and the stringy precipitate washed with hot water by decantation. The acid obtained is the 3,12-dihydroxy-7-ketocholanic acid having a melting point of 163–164° C.

Example 3

10 g. of cholic acid is dissolved in 30 c. c. of glacial acetic acid and oxidized with 55 c. c. of a normal chromic oxide solution. The keto-hydroxy acid is then extracted from the reaction mixture with butanol and from the butanol solution with a dilute alkali solution. The acid is precipitated from its alkali solution with acetic acid, filtered and dissolved in methyl alcohol. The methyl alcohol solution is treated in the manner outlined under (a) in Example 1 for the formation of the semicarbazone and subsequently hydrolyzed to the desired 3,12-di-hydroxy-7-ketocholanic acid.

Example 4

The following nutrient medium was prepared:

| | | |
|---|---|---|
| Ammonium sulfate | g | 188 |
| Sodium chloride | g | 19 |
| Potassium dihydrogen phosphate 0.2 molar | c. c. | 4000 |
| Sodium hydroxide 1 normal | c. c. | 799 |
| Salt mixture | c. c. | 40 |
| 0.5% magnesium chloride | | |
| 0.5% ferrous chloride | | |
| 0.5% calcium chloride | | |
| Peptone | g | 19 |
| Glycerol | g | 63.9 |
| Distilled water added to make | l | 40 |

To this solution was added sodium cholate in an amount to produce a 1 per cent sodium cholate solution. The sodium cholate was readily prepared by neutralizing cholic acid with dilute sodium hydroxide. The solution was sterilized and inoculated with a 24-hour culture of the bacteria *Alcaligenes faecalis*, as suggested by L. H. Schmidt and Mary I. Green in "Journal of Biological Chemistry," vol. 140, pp. CXI and CXII, "Bacterial oxidation of cholic acid." The solution was maintained at a pH of between about 8 to 9 and the temperature at between about 35 and 40° C. Sterile air is passed into this medium for a period of 96 hours, at which time the micro-organisms were removed by centrifugation. The crude mixture of oxidized acids was precipitated by adding hydrochloric acid until the solution attained a pH of 2, and the precipitate digested with hot water. The precipitate was reduced to a powder and dried between 45 and 50° C.

The dried mixture was esterified with methyl alcohol containing sulfuric acid in an amount of 3 per cent by weight of the alcohol, 2 c. c. of the methyl alcohol-sulfuric acid solution being employed for each gram of the dried precipitate. The methyl esters were obtained as gummy solids on dilution of the alcohol-acid solution with water. The sulfuric acid in the ester mixture was neutralized by washing with warm water containing sodium bicarbonate. The crude methyl esters were then dissolved in 1500 c. c. of methyl alcohol and treated with a solution of 200 g. of semicarbazide hydrochloride and 185 g. of sodium acetate dissolved in 300 c. c. of water and 200 c. c. of methyl alcohol. The mixture was refluxed for one hour and the solid materials were separated by filtration. The filtrate was diluted with water, whereby the solute was precipitated. The solids were washed with water, dried between 80 and 85° C., and taken up with an equal weight of benzene. The benzene dissolves any methyl cholate present and the solid remaining in the semicarbazone of methyl 3,12-dihydroxy-7-ketocholanate. This latter is then converted to 3,12-dihydroxy-7-ketocholanic acid, if desired, in the following manner: 25 g. of the latter material are dissolved in a solution consisting of 100 c. c. of 50 per cent methyl alcohol and 50 c. c. of sulfuric acid and heated on a water bath for one-half an hour. The crude acid ester is precipitated with water and washed with dilute bicarbonate solution. The crude ester is then dissolved in 2N-sodium hydroxide solution and heated to boiling. The solution is then acidified with mineral acid and the precipitate formed is washed with hot water by decantation. The resulting material is dried to constant weight at 110° C. and is 3,12-dihydroxy-7-ketocholanic acid, having a melting point of 163–164° C.

It is to be understood that instead of the semicarbazone, the corresponding hydrazone may be prepared or used for the isolation, as by refluxing the 7-keto compound in a methanol solution with a suitable amount of 85 per cent hydrazine hydrate solution, for example, which may then be isolated as such or hydrolyzed in a similar manner to that described for the semicarbazone, to give a keto group at the 7 carbon atom.

What I claim and desire to secure by Letters Patent is:

1. A compound having the general formula

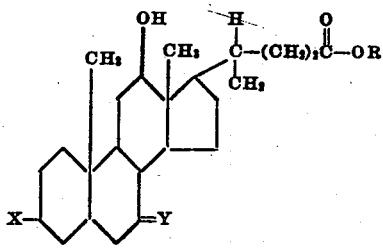

where R is a substituent selected from the group consisting of hydrogen, an alkyl radical, and a metal, X is a substituent selected from the group consisting of a hydroxyl radical, an aroyloxy radical, and an acyloxy radical, and Y represents a substituent selected from the group consisting of oxygen, a semicarbazone radical, and a hydrazone radical.

2. A compound crystallized from aqueous acetone melting at 163–164° C. and having the formula

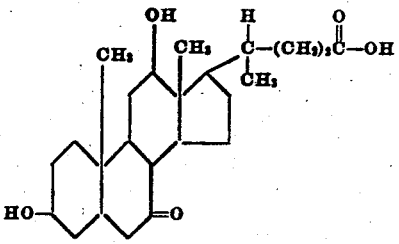

3. A compound melting at 145–146° C. and having the formula

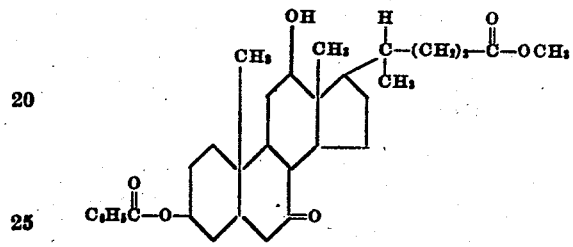

4. A compound having the formula:

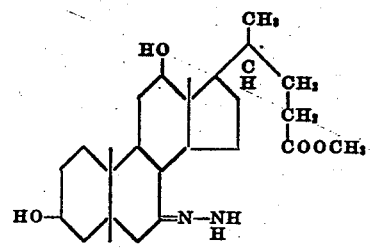

WILLARD M. HOEHN.